UNITED STATES PATENT OFFICE.

NATHANIEL C. FOWLER, OF BOSTON, ASSIGNOR TO EDWARD G. FOWLER, OF CAMBRIDGE, MASSACHUSETTS.

HEAT-INSULATING COMPOUND.

SPECIFICATION forming part of Letters Patent No. 427,167, dated May 6, 1890.

Application filed December 22, 1888. Serial No. 294,384. (No specimens.)

*To all whom it may concern:*

Be it known that I, NATHANIEL C. FOWLER, a citizen of the United States, residing in Boston, in the county of Suffolk and State of Massachusetts, have invented a new and useful Heat-Insulating Compound, of which the following is a full, clear, and exact description.

The invention relates to a material or composition of matter to be employed for lining safes and deposit-vaults, the construction of treasury-boxes, fireproofing of buildings, warehouses, and other analogous purposes—such as covering steam-pipes, fire-boxes, locomotives, gas-retorts, and furnaces—and also for the purpose of lining ice boxes or chests, cooling houses, fruit and vegetable refrigerator-cars, and in fact for any other purpose whatsoever where a heat-insulating substance is desirable.

The base of my improved compound is ashes and carbonate of calcium; or instead of ashes I may employ to equal advantage carbonate of magnesia, diatomaceous earth, (fossil earth,) or clay, which are the equivalents of ashes. The ashes I prepare by sifting or equivalent means to separate them from the unconsumed particles of coal and silicious matter, the carbonate of magnesia in the manner it is prepared for commercial purposes, and the diatomaceous earth and clay by lixiviation or other means to clarify it.

I prepare the compound in the following manner: I take from eighty to ninety per cent. of ashes or carbonate of magnesia or fossil earth and five to ten per cent. or more of carbonate of calcium, ascertained by weight, and five to ten per cent. of fiberized asbestus or animal or vegetable fiber. I also add, after thoroughly dry-mixing the above ingredients, a sufficient quantity of water to enable me to mix and incorporate the whole together, so as to produce a homogeneous mass, which may be applied as ordinary plastering-mortar; but when the highest degree of protection against fire is required I employ of ashes, as prepared above, or carbonate of magnesia or diatomaceous earth, eighty-five per cent., of fiberized asbestus or animal or vegetable fiber five per cent., of lamp-black from one and a half to two and a half per cent., and of pulverized pumice-stone three per cent. These ingredients I thoroughly mix and incorporate together in a dry condition, and when required for use I add the requisite quantity of water to produce, when mixed and incorporated together, a plastic mass, which may be used either as a mortar or molded and dried in any form that is desirable.

The above ingredients are so uniformly porous as to constitute a resistance to heat of great value and efficiency, and in addition the carbonate of calcium serves as a binder to the other diatoms of matter to prevent the disintegration of the mass liable to result from shocks and vibrations or from excessive heat. Although asbestus is not a non-conductor of heat, yet when reduced to a finely-fiberized condition and uniformly mingled in the mass its heat-conducting effect is but slight, and it is of sufficient service to render the applied material less liable to fracture and disintegrate; but I prefer in most cases to employ animal or vegetable fiber, as it not only strengthens the mass, but when subjected to heat is slowly consumed thereby, thus serving the double purpose of producing carbonic-acid gas in minute jets, which retard the advance of heat, and leaving additional air-cells in the mass. The effect of lamp-black or other finely-divided carbonaceous matter is also to greatly increase the number of air-cells when the mass is subjected to heat, as the decomposition thereby of the particles of lamp-black produces corresponding air-cells, besides setting free a quantity of carbonic-acid gas by such decomposition, which tends to resist and retard the advance of heat. The value of the pulverized pumice-stone consists in the fact that when the composition is subjected to a high degree of heat it becomes fused or softened to an extent to cause it to flow and to produce a hard and smooth surface calculated to protect the material from disintegration.

When a hard or polished surface is required, ashes and carbonate of calcium alone are required, and when a high temperature is not of paramount importance a greater proportion of carbonate of calcium may be used.

My improved compound may be used in a plastic condition, or as mortar, or in sheets, or molded into any desired shape.

Having thus described my invention, the following is what I claim as new therein and desire to secure by Letters Patent:

1. The herein-described compound, consisting of sifted or lixiviated ashes or the described equivalents and carbonate of calcium, substantially as set forth.

2. The herein-described compound, consisting of sifted or lixiviated ashes or the described equivalents, carbonate of calcium, and finely-fiberized fiber, substantially as set forth.

3. The herein-described compound, consisting of sifted or lixiviated ashes or the described equivalents, carbonate of calcium, finely-fiberized fiber, and finely-divided carbonaceous matter, substantially as set forth.

4. The herein-described compound, consisting of sifted or lixiviated ashes or the described equivalents, carbonate of calcium, finely-fiberized combustible fiber, lamp-black, and pumice-stone, substantially as set forth.

NATHANIEL C. FOWLER.

Witnesses:
OCTAVIUS KNIGHT,
HERVEY S. KNIGHT.